June 15, 1926.

T. W. MILLER

SPONGE RUBBER SHEET

Filed Sept. 8, 1924  3 Sheets-Sheet 1

1,588,487

INVENTOR
Thomas W. Miller
BY
ATTORNEYS

June 15, 1926.
T. W. MILLER
SPONGE RUBBER SHEET
Filed Sept. 8, 1924    3 Sheets-Sheet 2
1,588,487
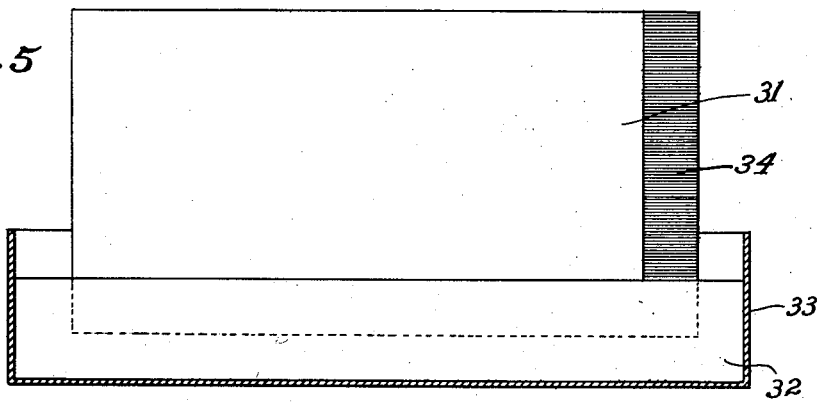
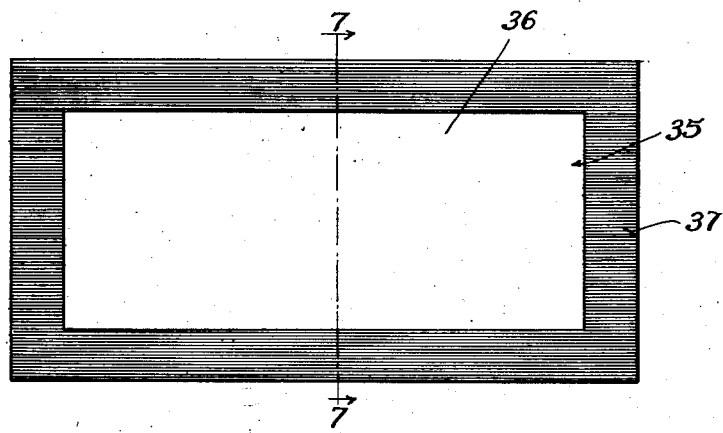
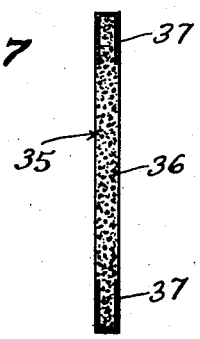
INVENTOR
Thomas W. Miller
BY
ATTORNEYS June 15, 1926.  1,588,487
T. W. MILLER
SPONGE RUBBER SHEET
Filed Sept. 8, 1924   3 Sheets-Sheet 3
Fig. 8
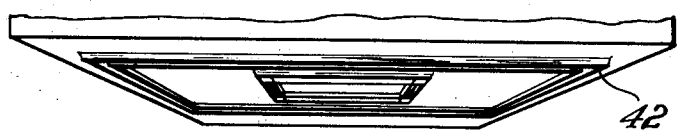
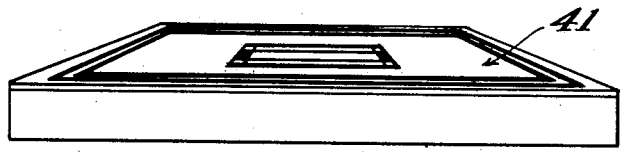
Fig. 9
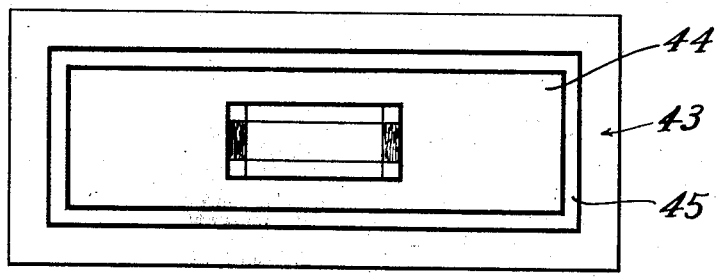
Fig. 10
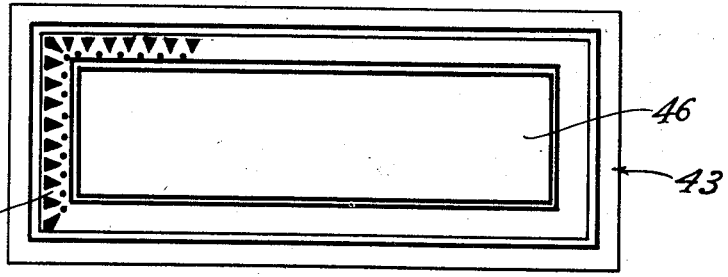
Fig. 11
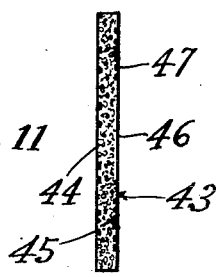
INVENTOR
Thomas W. Miller
BY
ATTORNEYS Patented June 15, 1926.

1,588,487

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

SPONGE RUBBER SHEET.

Application filed September 8, 1924. Serial No. 736,668.

My invention relates to sponge rubber sheets and is herein described, for purposes of illustration, as applied to the production of sponge rubber bath mats. In the drawings accompanying this specification and forming a part thereof:—

Figure 5 illustrates a second method of producing such a mat,

Figures 6 and 7 show a mat produced by the method of Figure 5,

Figure 8 illustrates a third method of producing such a mat, while

Figures 9 through 11 show a mat produced by the method of Figure 8.

Figure 1:
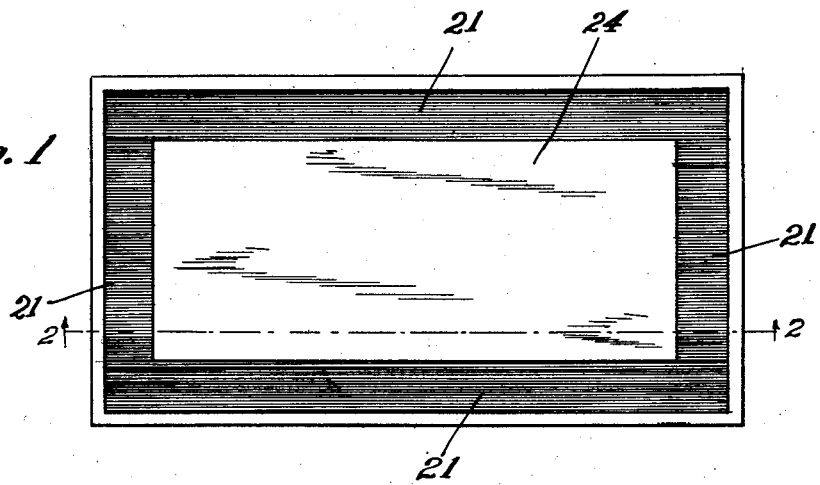
Figures 1 and 2 illustrate one method of forming such a mat.
Figure 2:
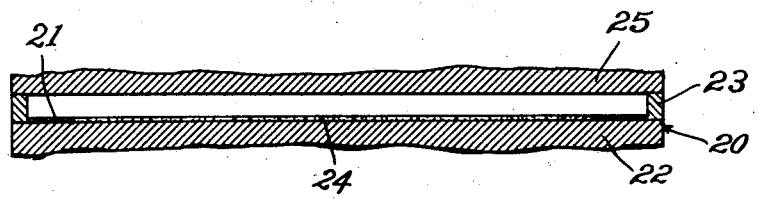
Figure 3:
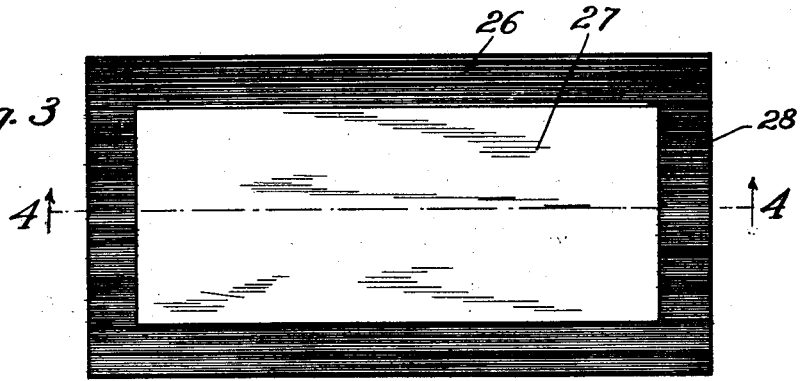
Figures 3 and 4 show a mat produced by this method.
Figure 4:
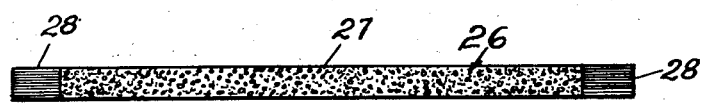

In the process illustrated in Figures 1 and 2 I place strips 21 of sponge rubber stock upon the bottom plate 22 of a suitable mold 20 in position to form a border within the cavity of the mold center plate 23 and then place upon the mold bottom plate 22, and within the space surrounded by the border strips 21, a sheet 24 of sponge rubber stock of a color different from the color of the border strips 21. I then apply the top mold plate 25 and place the entire mold 20 in a press for vulcanization of the sponge rubber stock in the usual manner. In this way I secure the sponge rubber mat 26 illustrated in Figures 3 and 4, comprising the center portion 27 formed from the sheet 24 and of one color and the border portion 28 formed from the border strips 21 and of a different color, and having the color in each part extending entirely through from one face to the other.

In the method illustrated in Figure 5 the sponge rubber mat 31 is formed and vulcanized from sponge rubber stock of a single color, preferably a relatively light color such as the lightest color desired in the finished product, and this vulcanized sponge rubber mat 31 is then dipped, as herein illustrated, into a solution 32 contained within a receptacle 33, of a color arranged to coact with the existing color of the mat 31 to produce the desired different color upon the treated portions 34 of the surface of the mat 31, of such a nature as to penetrate the surface of the mat 31 and become an integral part of the mat 31, and itself preferably suitably colored rubber cement. In this manner I produce the sponge rubber mat 35 illustrated partially completed in Figure 6 and completed in Figure 7, comprising an untreated center portion 36 of the original color and a treated portion 37 of the different color imparted by the material 32, and having the coloring material applied only to the surface but nevertheless penetrating into the mat and formed into an integral part thereof.

In the method illustrated in Figure 8 the sponge rubber mat 41 is formed similar to the mat 31 but the color is applied by imprinting by means of a plate 42 carrying thereon the coloring material such as the colored rubber cement. In this manner I produce the sponge rubber mat 43 illustrated in Figures 9 through 11 comprising on one face an untreated portion 44 of the original color and a treated portion 45 of the different color imparted by the coloring material imprinted thereon and on the other face an untreated portion 46 of the original color and a treated portion 47 of the different color imparted by the same or other coloring material imprinted on that face.

In each of the mats herein illustrated I form both faces smooth whereby the mat may not only be more readily cleaned but both faces may be ornamented and the two faces then alternated to substantially double the effective life of the mat. Particularly in the case of the mat 43 I also find it entirely feasible to provide a different design on the two sides of the mat, as illustrated herein, whereby the two sides are not only effective to substantially double the life of the mat but also to provide variety. At the same time it is apparent that if I so desire I may use but one face of this sponge rubber mat and that in such case I may back the mat with supporting material such as canvas or I may alternatively support the sponge rubber mat by canvas or other supporting material positioned intermediate the two faces of the mat and therefore in no way interfering with the use of either face of the mat.

It will of course be obvious that in each case I may use designs other than the relatively simple designs herein illustrated and that I may employ any desired number of colors. It will also be obvious that the more complicated designs may be more readily applied by the method of Figure 8, that designs may be more cheaply applied by the methods of Figures 5 and 8, and that the method of Figures 1 and 2 provides a mat wherein the ornamentation remains even after wearing away of the entire original surface. It will also be understood that my invention is equally applicable to other types of floor covering and in large measure to sheet sponge rubber generally. In addition, those skilled in the art will readily realize that the particular embodiments of my invention herein disclosed may be variously changed and modified without departing from the scope of my invention or sacrificing the advantages thereof and it will therefore be understood that this disclosure is illustrative only and that my invention is not limited thereto.

I claim:

1. As an article of manufacture, a sheet having at least one face formed of sponge rubber ornamented by the application thereto of at least one surface coloring penetrated into and integral with the sponge rubber of such face.

2. As an article of manufacture, a sheet formed of sponge rubber and having at least one face ornamented by the application thereto of at least one surface coloring penetrated into and integral with the sponge rubber of such face.

3. As an article of manufacture, a sheet having each face formed of sponge rubber ornamented by the application thereto of at least one surface coloring penetrated into and integral with the sponge rubber of such face.

4. As an article of manufacture, a sheet formed of sponge rubber and having each face ornamented by the application thereto of at least one surface coloring penetrated into and integral with the sponge rubber of such face.

5. As an article of manufacture, a sheet having at least one face formed of sponge rubber ornamented by the application thereto of rubber cement of at least one color other than that of said face.

6. As an article of manufacture, a sheet formed of sponge rubber and having at least one face ornamented by the application thereto of rubber cement of at least one color other than that of said face.

7. As an article of manufacture, a sheet having each face formed of sponge rubber appearing in at least two colors and with the ornamentation of each face different from that of the other face.

8. As an article of manufacture, a sheet formed of sponge rubber and having each face appearing in at least two colors and with the ornamentation of each face different from that of the other face.

In testimony whereof, I hereunto affix my signature.

THOMAS W. MILLER.